Aug. 9, 1955  W. J. OWEN ET AL  2,714,808
REFRIGERATING APPARATUS
Filed Dec. 26, 1952  5 Sheets-Sheet 2

INVENTOR.
Webster J. Owen
John F. Gordon and
Philip W. Maurer
By Willits, Hardman & Fehr
Attorneys

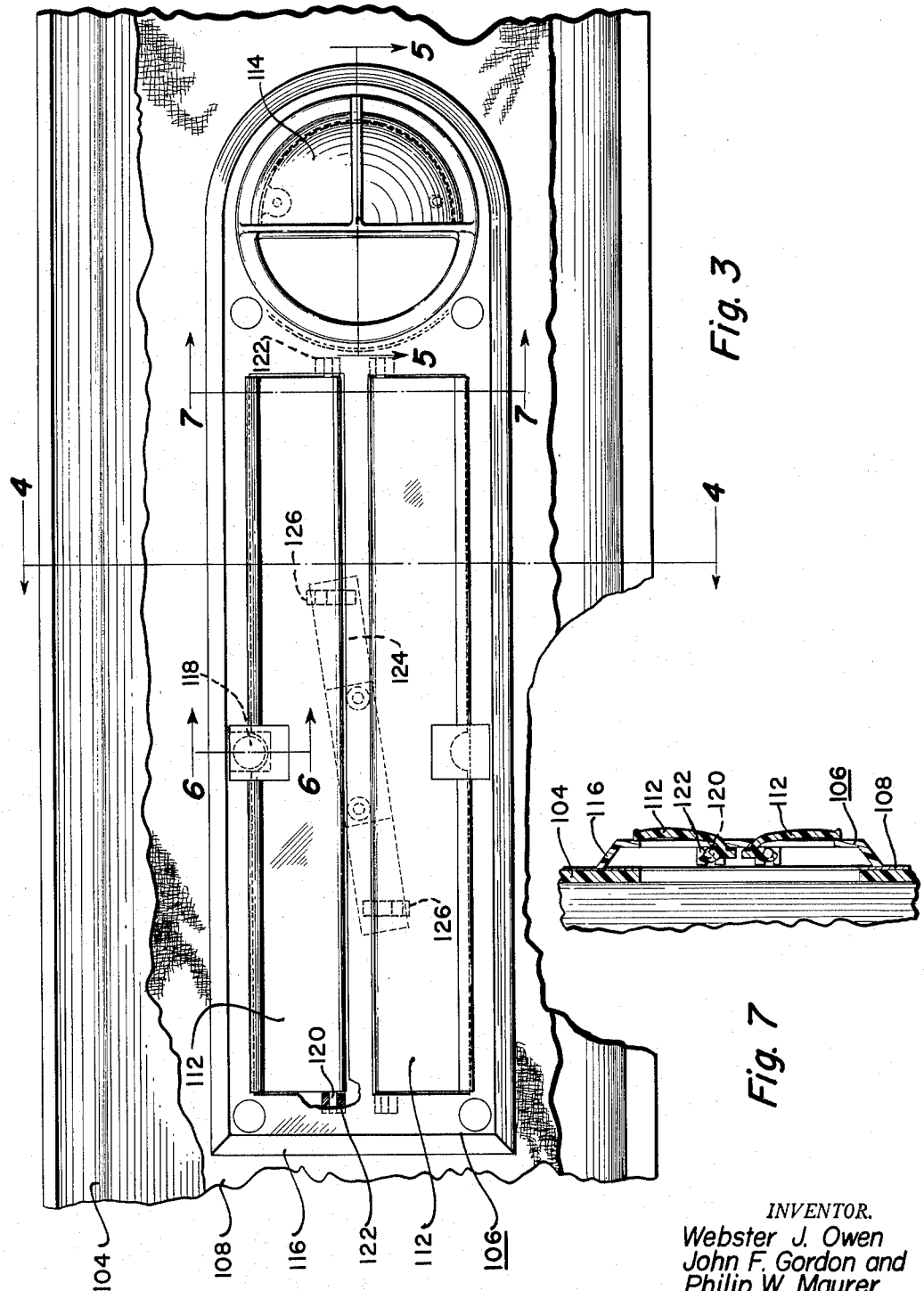

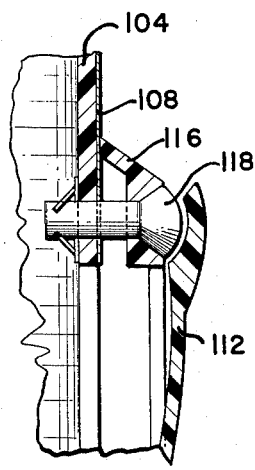
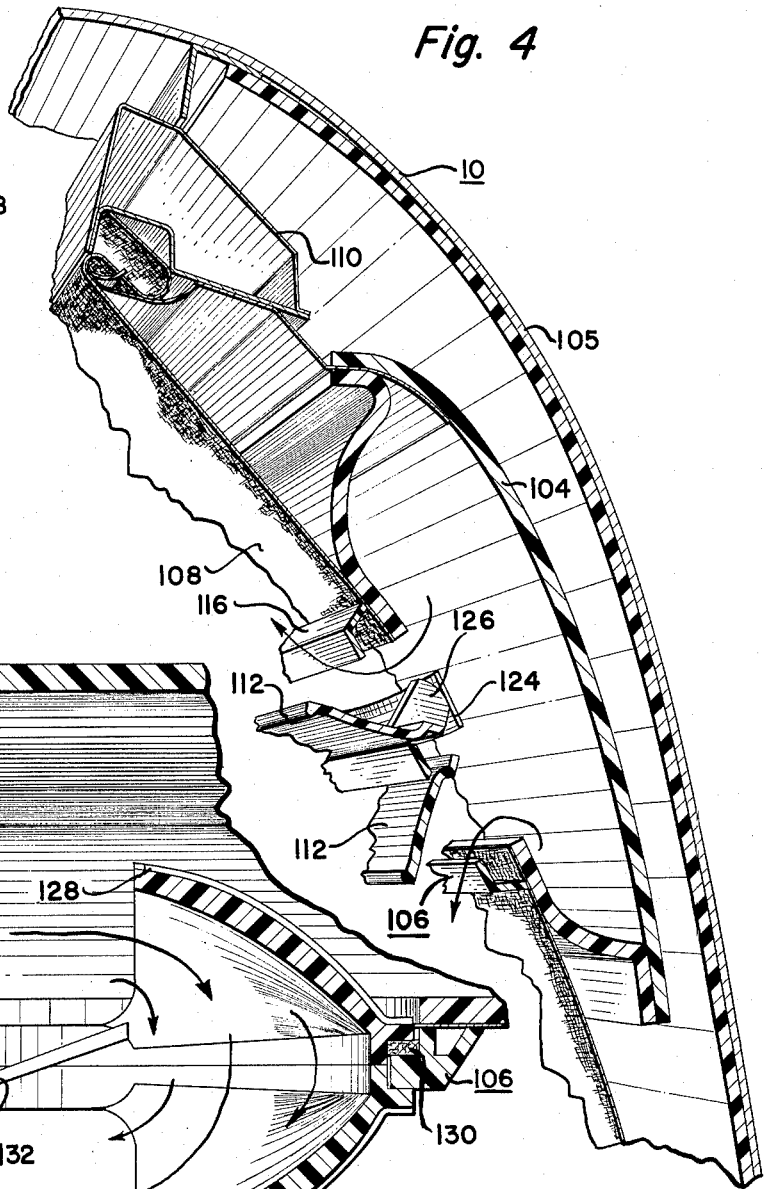
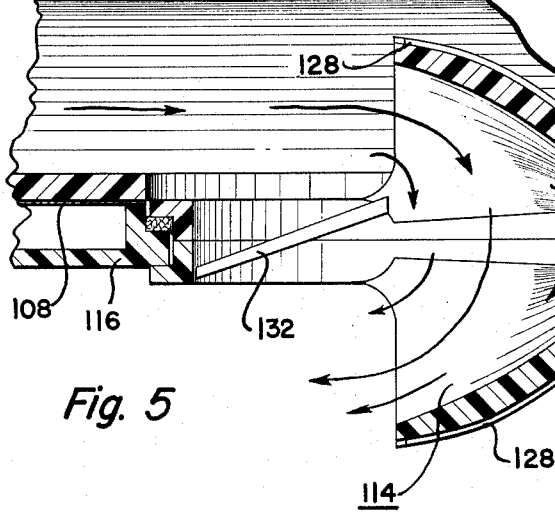
*Fig. 6*
*Fig. 4*
*Fig. 5*
INVENTOR.
Webster J. Owen
John F. Gordon and
Philip W. Maurer
By Willits, Hardman & Fehr
Attorneys

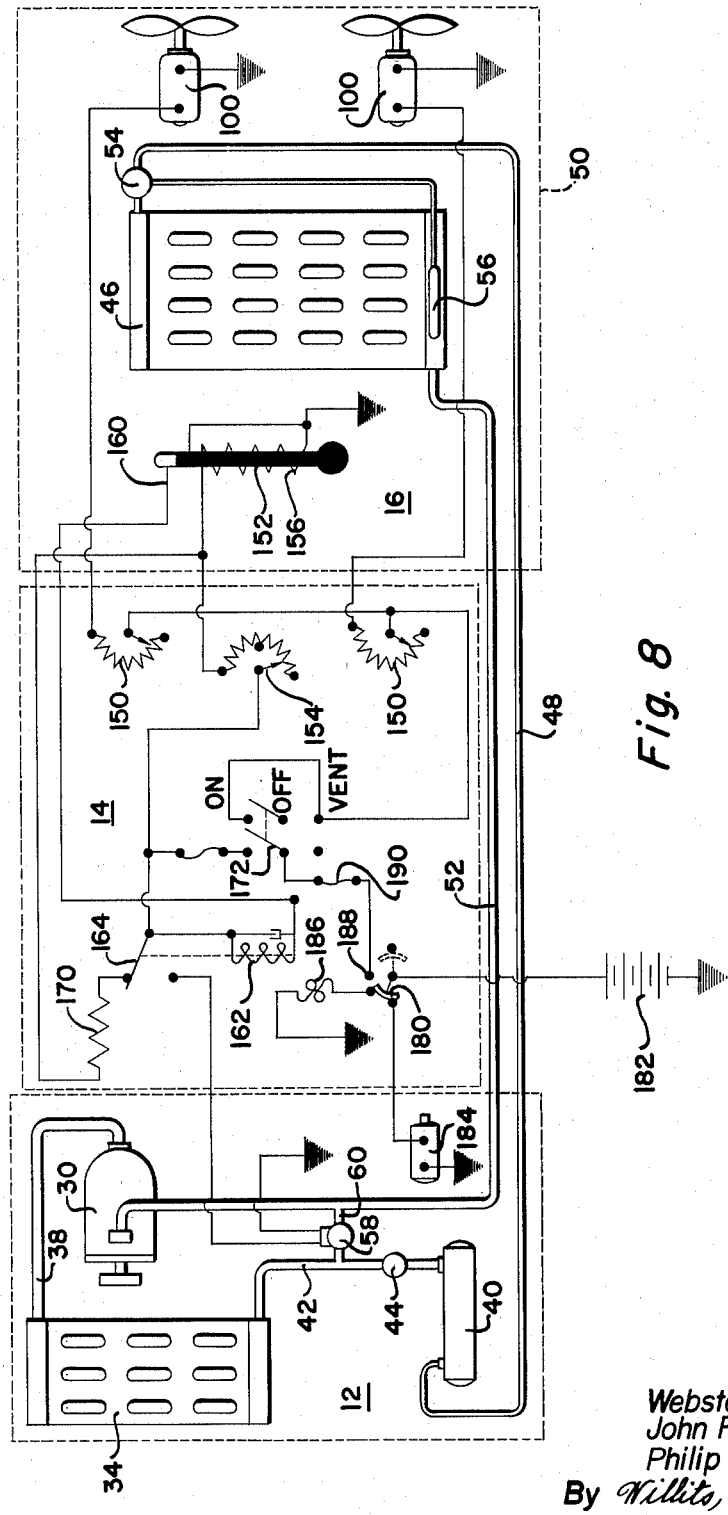

United States Patent Office 2,714,808
Patented Aug. 9, 1955

2,714,808

REFRIGERATING APPARATUS

Webster J. Owen and John F. Gordon, Birmingham, and Philip W. Maurer, Dearborn, Mich., assignors to General Motors Corporation, Detroit, Mich., a corporation of Delaware Application December 26, 1952, Serial No. 328,008

14 Claims. (Cl. 62—4)

This invention relates to refrigerating apparatus and more particularly to apparatus for use in cooling the air for the passenger compartment of an automobile.

It is an object of this invention to provide an air conditioning system capable of closely controlling both the air temperature and the air circulation in all portions of the passenger compartment.

Another object of this invention is to provide an improved car air conditioning control arrangement wherein all of the controls for regulating the temperature, air distribution, and the introduction of fresh air are all accessible within the passenger compartment.

Still another object of this invention is to provide an improved arrangement for disposing of rain water and condensate water which might collect in various portions of the air conditioning system.

A further object of this invention is to provide an improved arrangement for mounting the air ducts in a passenger automobile.

Further objects and advantages of the present invention will be apparent from the following description, reference being had to the accompanying drawings, wherein a preferred form of the present invention is clearly shown.

In the drawings:

Figure 3 is an elevational view with parts broken away showing one of the conditioned air outlet grills;

Figure 4 is a fragmentary perspective view showing the relationship between the air distributing grill, the air supply duct, the head liner of the car and the head rail of the car;

Figure 5 is a fragmentary sectional view taken substantially on line 5—5 of Figure 3;

Figure 6 is a fragmentary sectional view taken substantially on line 6—6 of Figure 3;

Figure 7 is a sectional view taken substantially on line 7—7 of Figure 3; and,

Figure 8 is a diagrammatic view showing the relationship between the electrical controls and thhe refrigerant circuit.

Figure 1:
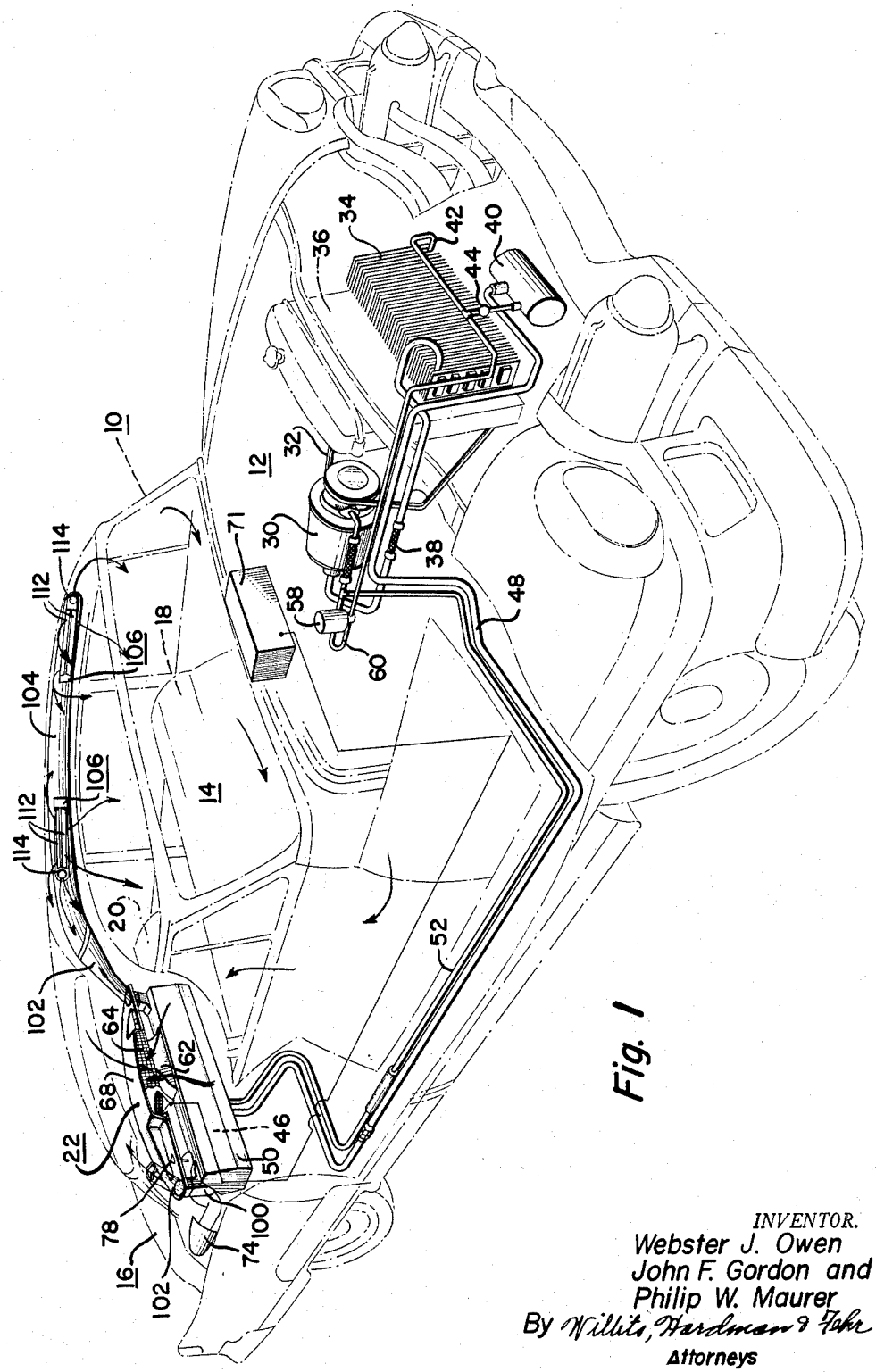
Figure 1 is a perspective view partly in phantom showing somewhat diagrammatically the arrangement of the air conditioning system within the passenger compartment of an automobile.

Referring now to the drawings wherein there is illustrated a preferred embodiment of the invention, reference numeral 10 generally designates a passenger automobile having an engine compartment 12, a passenger compartment 14 and a luggage compartment 16. For purposes of illustrating the invention, there is shown a passenger automobile of the type having a front seat 18 and a rear seat 20 whereas certain aspects of the invention are equally applicable to coupes having only the one seat which extends across the full width of the car. It is now standard practice in most all types of cars to provide a shelf or ledge directly behind the rearmost seat which conventionally may be termed a package shelf. In the illustration shown, the package shelf has been designated by the reference numeral 22 and has been modified in its construction in a manner to be explained more fully hereinafter.

The air conditioning equipment for the automobile consists of a compressor 30 mounted in the engine compartment of the car and driven by the main car engine through a belt 32 in accordance with practice now well known. The compressed refrigerant flows from the compressor 30 through a line 38 to a condenser 34 located in front of the engine radiator 36. The condensed refrigerant 34 flows into a receiver 40 through a line 42 in which a check valve 44 is located. The check valve 44 allows the free flow of refrigerant from the condenser to the receiver 40 but prevents the reverse flow of liquid refrigerant. The liquid refrigerant flows from the receiver 40 into an evaporator 46 through the liquid line 48. The evaporator 46 is mounted within a housing 50 located within the luggage compartment of the car. The refrigerant which is vaporized in the evaporator 46 returns to the compressor 30 through the suction line 52.

As best shown in Figure 8 of the drawing, a thermostatic expansion valve 54 is provided in the line 48 for controlling the flow of refrigerant to the evaporator. The valve 54 includes the usual thermostatic bulb 56 located adjacent the outlet of the evaporator for throttling the supply of liquid refrigerant to the evaporator when the refrigerating effect reaches the outlet of the evaporator.

The flow of refrigerant within the system is further controlled by means of a normally open solenoid valve 58 located in a by-pass line 60 which serves to connect the outlet of the condenser to the inlet of the compressor. By virtue of the above disclosed arrangement it is obvious that energization of the solenoid valve 58 causes the by-pass to be closed with the result that all of the refrigerant is required to flow through the compressor, the condenser, the receiver 40 and the evaporator 46 in series whereas when the solenoid valve 58 is deenergized, refrigerant is free to flow from the outlet of the condenser directly into the inlet of the compressor 30.

One effect of opening the by-pass valve 58 is to materially reduce the pressure within the condenser 34 with the result that the liquefied refrigerant in the condenser will flash into vapor and this vapor then returns to the inlet of the compressor. This vapor helps to cool the compressor at such times when little if any cold vapor returns to the compressor from the evaporator 46. Opening of the solenoid valve 58 has a further effect of equalizing the pressures in the condenser and the evaporator. This equalizing effect not only causes the hot refrigerant in the condenser to vaporize but also retards the rate at which the relatively cold liquid refrigerant in the evaporator vaporizes. Consequently, opening of the valve 58 does not completely stop the vaporization of the liquid in the evaporator immediately. The electrical controls for the solenoid valve 58 and other portions of the system will be described more fully hereinafter.

Figure 2:
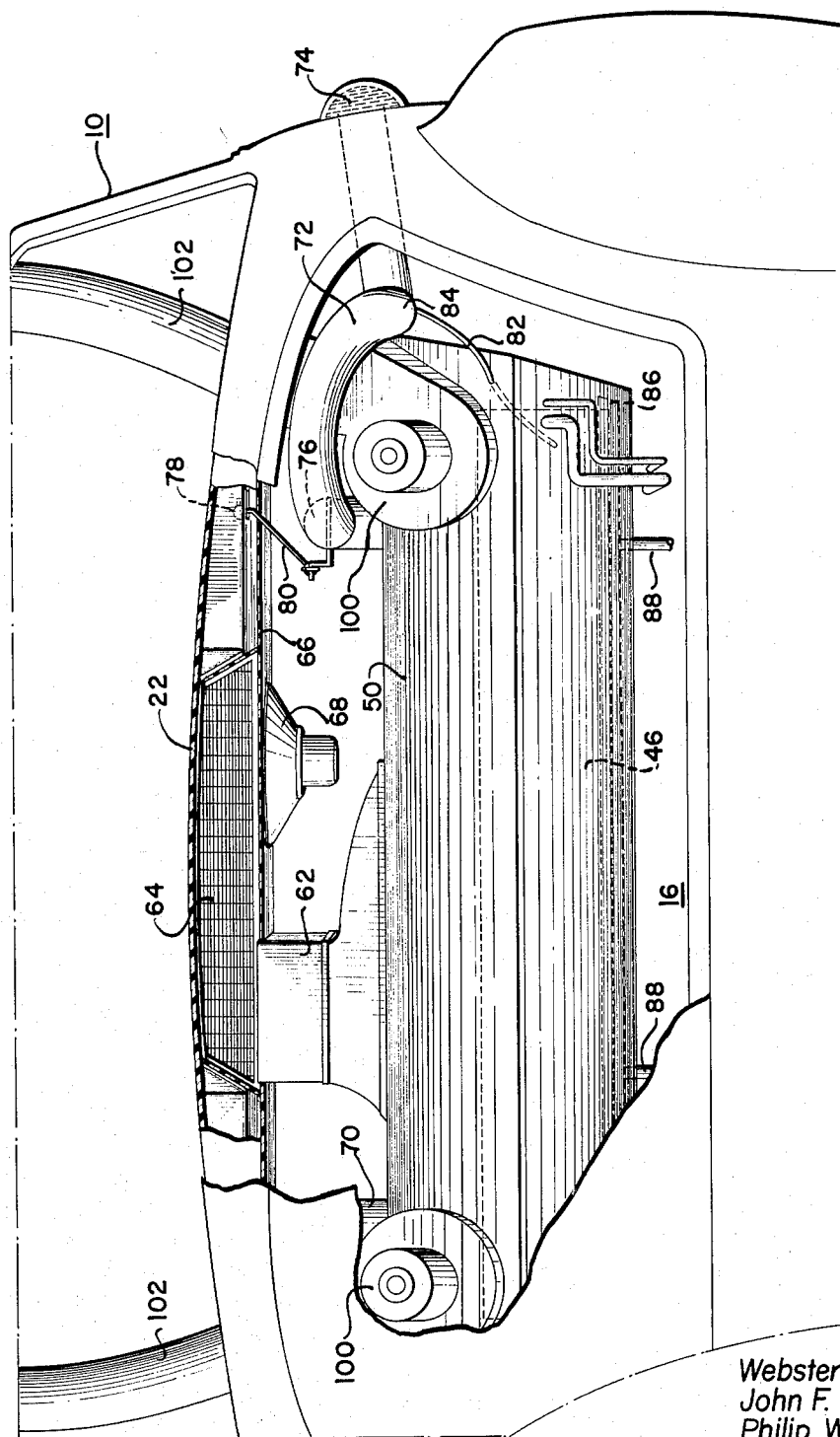
Figure 2 is a rear elevational view with parts broken away showing the air conditioning equipment mounted within the trunk compartment of the car shown in Figure 1.

The air to be conditioned is supplied to the evaporator housing 50 from two different sources. Thus, a return air duct 62 (see Figure 2) is provided for withdrawing air from the passenger compartment through a return air grill 64 located directly behind the rear seat of the car. The return air grill 64 is arranged substantially in a vertical plane whereby it is impossible to block the return flow of air when packages or the like are laid on top of the package shelf 22. A ledge or lower shelf-like member 66 is located beneath the shelf 22. The shelf 22 includes a raised hood-like element 68 which cooperates with the member 66 to form a return air passage therebetween for connecting the return air grill 64 to the return air duct 62. The lower shelf-like member 66 also serves to support a conventional loud speaker 68 forming a part of the car radio, which has been designated by the reference numeral 71. By virtue of the above construction, the sound waves are free to pass from the loud speaker 68 out through the air grill 64 thereby making the grill 64 serve a dual purpose.

In a system of this type it is highly desirable to introduce fresh air into the air conditioning unit so as to replace smoke laden air within the passenger compartment of the car. For this purpose, a pair of fresh air ducts 72 are provided for introducing fresh air from opposite sides of the car into the evaporator housing 50. Air scoops 74 are mounted on the outer side walls of the car and have their inlets facing the front of the car whereby fresh air is scooped into the ducts 72. The volume of air flowing through the ducts 72 may be controlled by the butterfly dampers 76.

The means for operating the butterfly dampers comprise knobs 78 mounted on the package shelf so as to be accessible from the passenger compartment of the car. Suitable linkage mechanisms 80 connect the knobs 78 to the dampers 76. Inasmuch as there will be times when rain water or snow will be mixed with the air entering the scoops 74 the ducts 72 have been provided with water drains 82 which convey water from the low point 84 in each duct to the condensate drain pan 86 located beneath the evaporator 46 within the evaporator housing 50. The rain water and condensate drains from the pan 86 to points beneath the car through a pair of drain pipes 88. For purposes of illustrating the invention, two drain pipes 88 have been shown adjacent opposite sides of the pan 86. These drains are preferably provided with gas traps (not shown) which prevent exhaust fumes or dust laden air from entering the evaporator compartment.

In order to simplify this disclosure the details of construction of the evaporator and the mounting brackets used in supporting the evaporator within the housing 50 have not been shown as these are broadly immaterial to the invention herein. For a description of the arrangement within the evaporator housing, reference is hereby made to application Serial No. 266,718 filed January 16, 1952. For purposes of illustrating the invention, an arrangement has been shown wherein two fans 100 serve to circulate the conditioned air into the passenger compartment of the car. The outlets of the fans 100 communicate with ducts 102 which pass through holes provided in the opposite ends of the package shelf as best shown in Figure 1 of the drawing.

The ducts 102 extend upwardly adjacent the two rear corners of the passenger compartment and terminate in horizontal portions 104 extending along the upper sides of the passenger compartment as best shown in Figure 1. Each of the ducts 104 (see Figure 4) is mounted between the outer wall or top of the car 105 and the conventional head liner 108 so as to be concealed thereby. The ducts 104 are supported from the head rails 110 which are of standard construction and need no further description.

The conditioned air leaves each duct 104 through a pair of outlet grills 106. Two of these outlet grills are provided on each side of the passenger compartment, the one being located directly opposite the front seat and the other being located directly opposite the rear seat. As best shown in Figure 3 of the drawings, each of the grills consists of a pair of horizontally extending pivoted shutters 112 and a rotatable air deflector 114. It will be noted that the air grill mounted adjacent the front end of the air distributing duct 104 has the rotatable air deflector 114 disposed towards the front of the car whereas the grill mounted adjacent the back seat has its air deflector 114 mounted towards the rear.

The shutters 112 and the rotatable air deflector 114 are both supported on a one piece aluminum or zinc alloy die cast escutcheon plate 116 which is disposed on the outside of the head liner 108, but is secured to the duct 104 by means of screws 118. Each of the shutters 112 is made in the form of an aluminum or zinc alloy die cast element having trunnions 120 which are supported in U-shaped lugs 122 formed integrally with the escutcheon plate 116. A spring 124 holds the shutters in assembled relationship on the escutcheon plate and also serves to hold the shutters in adjustment so that the occupants of the car can vary the amount of air discharging past the shutters. Each of the shutters is provided with an integral projection 126 which presses against the spring 124 as best shown in Figures 3 and 4.

The rotatable air deflector, generally designated by the reference numeral 114 is also made of aluminum or zinc alloy die cast and consists of two similar dome-shaped elements 128 constructed as shown in Figure 5 and fastened together. These elements form an outer peripheral channel 130 which engages the escutcheon plate 116 as shown. An air baffle 132 is provided as shown for directing the air through the air deflector 114. It is obvious that by rotating the deflector 114 it is possible to vary the direction of the air leaving the deflector.

Figure 5 of the drawings shows the deflector in a position wherein the incoming air is picked up by the inner half of the deflector 128 and is directed outwardly through the same as indicated by the arrows. By rotating the deflector 114 from the position in which it is shown in Figure 5 through an angle of 180 degrees, the amount of air flowing through the deflector will be materially reduced if not stopped entirely as the air will flow past the deflector without any portion of it being scooped out through the same.

It will be noted that the shutters 112 are so arranged that when the upper shutter is open it will direct a curtain of air along the ceiling of the passenger compartment, whereas the lower shutter will direct a curtain of air down along the side wall of the passenger compartment. It will also be noted that by virtue of the above described construction it is possible to individually control the air distributed into each portion of the passenger compartment and, if desired, to shut off all air flow into the rear portion of the passenger compartment. Thus on a hot day when the driver is the only occupant of the car it is possible for him to direct all of the conditioned air into the drivers compartment of the car. In order to further control the rate of cooling, each of the fans 100 is a variable speed fan.

The speed of each fan is controlled by a rheostat 150 preferably mounted on the dashboard or control panel of the car so as to be readily accessible from the drivers seat. In addition to controlling the speed of the fans it is also possible to control the temperature of the air by a thermostat 152 preferably located in the return air stream adjacent the inlet side of the evaporator. This thermostat serves to control the solenoid operated by-pass valve 58. The temperature at which the thermostat 152 opens and closes the solenoid valve 58 is controllable by a rheostat 154 preferably mounted on the dashboard of the instrument panel of the car. By setting the rheostat 154 in a given position, a controlled amount of current will be supplied to an electrical heater 156 arranged in thermal exchange relationship with the mercury column of the thermostat 152. The circuit is such that when the temperature of the air returning to the evaporator exceeds a predetermined amount, a circuit will be closed through the mercury to a contact 160 so as to thereby energize a solenoid coil 162 which operates a switch 164 so as to energize the solenoid valve 58 when refrigeration is required.

Figure 8 of the drawing shows the switch 164 in the position which it occupies when no refrigeration is required. In order to reduce the differential required for reclosing the thermostat, a resistance element 170 is connected in the circuit when this switch 164 is in its upper position. In addition to the temperature controlling rheostat 154 which merely establishes the temperature to be maintained within the passenger compartment, a master control switch 172 is provided in the circuit as shown.

This control switch is a double pole, triple throw switch which may be set to either an "off" position in which all of the air conditioning control circuits are deenergized, an "on" position in which the blowers and the thermostatic controls are energized or a "ventilating" position in which the blowers are energized, but the circuit leading to the thermostatic control is deenergized whereby the solenoid valve 58 in the by-pass line will be deenergized and remain open so as to cause the refrigerant leaving the condenser 34 to by-pass the evaporator. Reference numeral 180 designates the ignition and starter control switch.

The ignition switch 180 has been shown in a position in which it closes the circuit from the main storage battery 182 to the cranking motor 184 and the ignition system which has been designated by the reference numeral 186. The switch 180 is of the type which must be manually held in the position shown, but when the engine has started it will move clockwise a sufficient amount to maintain the ignition system energized and also supply current to the contactor 188 which supplies current to the master control switch 172. A fuse 190 is provided in the line leading to the master control switch. It will be obvious that from the circuit shown that in the event the fuse 190 blows, the by-pass valve 58 will remain deenergized irrespective of the setting of the switch 172 or the temperature affecting the thermostat 152. This serves to shut down the operation of the refrigerating system completely.

While the form of embodiment of the invention as herein disclosed constitutes a preferred form, it is to be understood that other forms might be adopted, as may come within the scope of the claims which follow.

What is claimed is as follows:

1. In an air conditioning system for cooling and ventilating the passenger compartment of an automobile; a refrigerating system including a compressor, a condenser, a receiver, and an evaporator connected in series refrigerant flow relationship, first refrigernt flow control means comprising a pressure reducing means between said receiver and said evaporator, second refrigerant flow control means responsive to refrigeration requirements in said passenger compartment for reducing the flow of refrigerant to said evaporator in response to a decrease in refrigeration requirements, and blower means for circulating air to be conditioned in thermal exchange relationship with said evaporator so as to cool the said air; means for distributing the air thus cooled within said passenger compartment; means for varying the volume of air distributed to various parts of said compartment including means for varying the speed of said blower means, a power source; circuit means for connecting said power source to said blower means and said second refrigerant flow control means; said circuit means including a multiple position switch constructed and arranged whereby in one position of said switch said blower means and said second control means are both deenergized whereas in a second position of said switch the blower means only is energized and in a third position of said switch the blower means and said second control means are both connected to said power source.

2. In an air conditioning system for cooling and ventilating the passenger compartment of an automobile; a refrigerating system including a compressor, a condenser, a receiver, and an evaporator connected in series refrigerant flow relationship, first refrigerant flow control means comprising a pressure reducing means between said receiver and said evaporator, and second refrigerant flow control means responsive to refrigeration requirements in said passenger compartment for reducing the flow of refrigerant to said evaporator in response to a decrease in refrigeration requirements; an evaporator housing having a recirculated air inlet and a fresh air inlet, variable speed blower means for circulating the air to be conditioned through said evaporator housing and in thermal exchange relationship with said evaporator so as to cool the air; duct means for introducing outside air into said fresh air inlet; means including a manual control element within said passenger compartment for controlling the quantity of outside air flowing through said duct means; means for distributing the air thus cooled within said passenger compartment; a power source; circuit means for connecting said power source to said blower means and said second refrigerant flow control means; said circuit means including a multiple position switch constructed and arranged whereby in one position of said switch said blower means and said second control means are both deenergized whereas in a second position of said switch the blower means only is energized and in a third position of said switch the blower means and said second control means are both energized.

3. In an air conditioning system for cooling and ventilating the passenger compartment of an automobile; a refrigeration system including a compressor, a condenser, a receiver and an evaporator connected in series refrigerant flow relationship, means including a normally open solenoid valve for unloading said compressor by controlling the flow of refrigerant in said refrigerating system, a casing enclosing said evaporator and provided with air inlet and outlet means, blower means for circulating the air to be conditioned through said casing, means for introducing air from said passenger compartment to said inlet means, means for introducing fresh air from outside said compartment to said inlet means, means operable from within said passenger compartment for controlling the volume of fresh air thus introduced, circuit means for connecting said source of power to said solenoid valve and said blower means, said circuit means including first switch means for controlling the energization of said solenoid valve in response to changes in refrigeration requirements and second switch means including a multiple position, manually operable switch for controlling the supply of power to said blower means and first switch means and said solenoid valve, said manually operable switch having one position in which only said blower means is energized, a second position in which said blower means and the circuit to said switch means are both energized and a third position in which neither said blower means nor said switch means are connected to said source of power, an engine for operating said automobile and said compressor, a starter motor for cranking said engine, a combination starter and ignition switch including means for disconnecting said manually operable switch means from the power source during the cranking operation so as to deenergize said blower means and unload said compressor while cranking said engine.

4. A cooling unit for use in an automobile having a passenger compartment and a luggage compartment comprising, a housing within said luggage compartment, a refrigerating system including an evaporator disposed within said housing, means for introducing a mixture of fresh air and recirculated air into said housing including a fresh air duct and a recirculated air inlet, air outlet means communicating with said housing for discharging air flowing through said housing into said passenger compartment, a condensate collecting pan located beneath said evaporator, drain means for draining condensate from said pan to a point outside of said automobile, blower means for pulling air from said passenger compartment and fresh air through said ducts, and means for draining water entering said fresh air duct into said condensate collecting pan.

5. In combination, an automobile having a passenger compartment, a luggage compartment, and an engine compartment, seating means within said passenger compartment, a package shelf behind said seating means overlying a portion of said luggage compartment, said package shelf having a raised central portion and a substantially vertical front wall having a return air inlet opening, an evaporator housing within said luggage compartment beneath said package shelf and having an air inlet opening and a conditioned air outlet provided therein, duct means for connecting said air inlet opening to said return air inlet opening, and means including a blower for circulating air through said housing.

6. In combination, an automobile having a passenger compartment, a luggage compartment, and an engine compartment, seating means within said passenger compartment, a shelf behind said seating means overlying a portion of said luggage compartment, air conditioning means including an evaporator housing within said luggage compartment, said shelf having air inlet and outlet openings provided therein, a radio loud speaker supported in said shelf for directing sound waves into the passenger compartment, means for connecting one of said openings to the inlet of said evaporator housing, means for connecting a second of said openings to the outlet of said evaporator housing, a package shelf overlying said first named shelf and having a raised portion overlying said loud speaker and one of said openings so as to form with said first shelf a chamber having an open side directed towards the front end of said passenger compartment through which both air and sound waves may pass.

7. In combination, an automobile having a passenger compartment, a luggage compartment, and an engine compartment, seating means within said passenger compartment, an evaporator housing within said luggage compartment, duct means for introducing fresh air from the sides of the car to said evaporator housing, damper means within said duct means, damper control means mounted in said passenger compartment for controlling the volume of fresh air flowing through said fresh air duct means, a ledge behind said seating means overlying a portion of said luggage compartment, said ledge having a plurality of openings provided therein, means for connecting one of said openings to the inlet of said evaporator housing, means for connecting a second of said openings to the outlet of said evaporator housing, and a package shelf overlying said ledge and having a raised central portion and a return air inlet opening in a substantially vertical plane adjacent said raised portion.

8. A cooling unit for use in an automobile having a passenger compartment comprising an evaporator housing, an evaporator disposed within said housing, refrigerant liquefying means for supplying liquid refrigerant to said evaporator, air outlet means communicating with said housing for discharging air flowing through said housing into said passenger compartment, a condensate collecting pan located beneath said evaporator, drain means for draining condensate from said pan, blower means for withdrawing air from said passenger compartment and directing the air thus withdrawn through said housing, means including a scoop arranged in the path of the outside air for scooping fresh air into said housing, means whereby water entering said scoop discharges into said condensate collecting pan, said air outlet means comprising an air discharging duct extending substantially the full length of said passenger compartment above the normal head room of said passenger compartment, said duct having a plurality of air outlets, air deflector means arranged adjacent said air outlets for controlling the air flow therethrough.

9. In combination, an automobile having a passenger compartment, a luggage compartment, and an engine compartment, seating means within said passenger compartment, an evaporator housing within said luggage compartment, duct means for introducing fresh air from the sides of the car to said evaporator housing, damper means within said duct means, damper control means mounted in said passenger compartment for controlling the volume of fresh air flowing through said fresh air duct means, a ledge behind said seating means overlying a portion of said luggage compartment, said ledge having a plurality of openings provided therein, means for connecting one of said openings to the inlet of said evaporator housing, means for connecting a second of said openings to the outlet of said evaporator housing, and a package shelf overlying said ledge and having a raised central portion and a return air inlet opening in a substantially vertical plane adjacent said raised portion, an air distributing duct extending along the side walls of said passenger compartment for distributing the conditioned air within said compartment, and damper means for controlling the distribution of said conditioned air within said compartment.

10. In combination, an automobile having a passenger compartment, a luggage compartment, and an engine compartment, seating means within said passenger compartment, an evaporator housing within said luggage compartment, duct means for introducing fresh air from the sides of the car to said evaporator housing, damper means within said duct means, damper control means mounted in said passenger compartment for controlling the volume of fresh air flowing through said fresh air duct means, a ledge behind said seating means overlying a portion of said luggage compartment, said ledge having a plurality of openings provided therein, means for connecting one of said openings to the inlet of said evaporator housing, means for connecting a second of said openings to the outlet of said evaporator housing, and a package shelf overlying said ledge and having a raised central portion and a return air inlet opening in a substantially vertical plane adjacent said raised portion, an air distributing duct extending along the side wall of said passenger compartment, a head rail adjacent the ceiling of said passenger compartment, and means for attaching said duct to said head rail, a head liner concealing said duct, and air outlet grills provided at spaced points along said air distributing duct.

11. In combination, an automobile having a passenger compartment, a luggage compartment, and an engine compartment, seating means within said passenger compartment, an evaporator housing within said luggage compartment, a ledge behind said seating means overlying a portion of said luggage compartment, said ledge having a plurality of openings provided therein, means for connecting one of said openings to the inlet of said evaporator housing, means for connecting a second of said openings to the outlet of said evaporator housing, an air distributing duct extending along the side wall of said passenger compartment, a head rail adjacent the ceiling of said passenger compartment, and means for attaching said duct to said head rail, a head liner concealing said duct, and air outlet grills provided at spaced points along said air distributing duct, each of said air outlet grills having an adjustable air deflector comprising means for directing one curtain of air along the ceiling and another curtain of air along the side wall of said passenger compartment.

12. In combination, an automobile having a passenger compartment, a luggage compartment, and an engine compartment, seating means within said passenger compartment, an evaporator housing within said luggage compartment, a ledge behind said seating means overlying a portion of said luggage compartment, said ledge having a plurality of openings provided therein, means for connecting one of said openings to the inlet of said evaporator housing, means for connecting a second of said openings to the outlet of said evaporator housing, an air distributing duct extending along the side wall of said passenger compartment, a head rail adjacent the ceiling of said passenger compartment, and means for attaching said duct to said head rail, a head liner concealing said duct, and air outlet grills provided at spaced points along said air distributing duct, each of said air outlet grills having a first adjustable air deflector means mounted for pivotal movement about a horizontal axis for directing one portion of the air and having a second air deflector mounted for rotation.

13. In combination, an automobile having a passenger compartment and an engine compartment, refrigerating equipment including a compressor and condenser mounted in said engine compartment and an evaporator for cooling air for said passenger compartment, a housing for said evaporator having an inlet and an outlet, means for conveying air to be conditioned to said inlet, an air distributing duct extending along the side wall of said passenger compartment and having its inlet connected to the outlet of said evaporator housing, a head rail adjacent the ceiling of said passenger compartment, means for attaching said duct to said head rail, a head liner concealing said duct, and air outlet grills provided at spaced points along said air distributing duct, each of said air outlet grills comprising an escutcheon plate carried by said air distributing duct and overlapping a portion of said head liner, each of said air outlet grills having first adjustable air deflector means of the pivoted type for controlling the quantity and vertical direction of the air discharged through one portion of the grill, a second adjustable air deflector means of the rotatable type and carried by said escutcheon plate for controlling the quantity and both the vertical and horizontal direction of the air flowing through another portion of the grill.

14. In combination, an automobile having a passenger compartment and an engine compartment, refrigerating equipment including a compressor and condenser mounted in said engine compartment and an evaporator for cooling air for said passenger compartment, a housing for said evaporator having an inlet and an outlet, means for conveying air to be conditioned to said inlet, an air distributing duct extending along the side wall of said passenger compartment and having its inlet connected to the outlet of said evaporator housing, a head rail adjacent the ceiling of said passenger compartment, means for attaching said duct to said head rail, a head liner concealing said duct, and air outlet grills provided at spaced points along said air distributing duct, each of said air outlet grills comprising an escutcheon plate carried by said air distributing duct and overlying a portion of said head liner, each of said air outlet grills having a pair of vertically adjustable air deflector vanes for directing controlled quantities of air along the ceiling and side wall of said passenger compartment and having a rotatable air deflector provided with a scoop portion projecting into said air distributing duct and a substantially semi-spherical air deflector projecting into the passenger compartment.

References Cited in the file of this patent

UNITED STATES PATENTS

| | | |
|---|---|---|
| 1,945,944 | Leilich | Feb. 6, 1934 |
| 2,032,572 | Hammers | Mar. 3, 1936 |
| 2,108,391 | Rice | Feb. 15, 1938 |
| 2,169,664 | Shifflett | Aug. 15, 1939 |
| 2,172,944 | Norris | Sept. 12, 1939 |
| 2,286,961 | Hanson | June 16, 1942 |
| 2,311,622 | Alexander | Feb. 23, 1943 |
| 2,344,864 | Griswold | Mar. 21, 1944 |
| 2,476,295 | Hans | July 19, 1949 |
| 2,640,409 | Hans | June 2, 1953 |